(12) United States Patent
Toyoshima

(10) Patent No.: US 8,131,160 B2
(45) Date of Patent: Mar. 6, 2012

(54) POLARIZATION DIRECTION SYNCHRONIZATION DETECTING CIRCUIT AND RECEIVING APPARATUS

(75) Inventor: Morio Toyoshima, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 419 days.

(21) Appl. No.: 12/458,731

(22) Filed: Jul. 21, 2009

(65) Prior Publication Data

US 2010/0021178 A1 Jan. 28, 2010

(30) Foreign Application Priority Data

Jul. 22, 2008 (JP) ................................. 2008-188029

(51) Int. Cl.
*H04B 10/00* (2006.01)
(52) U.S. Cl. .......................... 398/202; 398/205; 398/212
(58) Field of Classification Search ........... 398/202–214
See application file for complete search history.

(56) References Cited

U.S. PATENT DOCUMENTS

| | | | | |
|---|---|---|---|---|
| 4,903,342 A * | 2/1990 | Yamazaki | ...................... | 398/204 |
| 5,031,236 A * | 7/1991 | Hodgkinson et al. | ......... | 398/152 |
| 5,327,278 A * | 7/1994 | van Deventer | ................ | 398/152 |
| 5,986,784 A * | 11/1999 | Kersey et al. | .................... | 398/152 |
| 6,236,488 B1 * | 5/2001 | Shimizu et al. | ................ | 398/198 |
| 6,538,786 B1 * | 3/2003 | Naito | ............................ | 398/152 |
| 6,559,991 B1 * | 5/2003 | Farley et al. | .................... | 398/152 |
| 6,634,808 B2 * | 10/2003 | Glingener | ....................... | 398/65 |
| 6,678,431 B2 * | 1/2004 | Han et al. | ......................... | 385/11 |
| 6,959,152 B2 * | 10/2005 | Fujiwara et al. | ................ | 398/81 |
| 6,999,688 B1 * | 2/2006 | Hui et al. | ....................... | 398/205 |
| 7,127,166 B2 * | 10/2006 | Glingener | ....................... | 398/65 |
| 7,343,100 B2 * | 3/2008 | Yao | ................................. | 398/152 |
| 7,486,898 B2 * | 2/2009 | Bulow | .......................... | 398/209 |
| 7,616,898 B2 * | 11/2009 | Charlet et al. | ................. | 398/152 |
| 7,620,326 B2 * | 11/2009 | Glingener | ....................... | 398/152 |
| 7,693,419 B1 * | 4/2010 | Chen et al. | ...................... | 398/25 |
| 7,724,435 B1 * | 5/2010 | Yan et al. | ................. | 359/490.01 |
| 7,796,894 B1 * | 9/2010 | Yao | ................................ | 398/159 |
| 7,865,086 B2 * | 1/2011 | Tomaru | ......................... | 398/204 |
| 7,995,930 B2 * | 8/2011 | Yoneyama et al. | ........... | 398/208 |
| 8,000,610 B2 * | 8/2011 | Yao | ................................. | 398/152 |
| 8,032,025 B2 * | 10/2011 | Ibragimov et al. | .............. | 398/65 |
| 8,045,856 B2 * | 10/2011 | Shen et al. | ....................... | 398/65 |
| 2004/0109220 A1 * | 6/2004 | Han et al. | ...................... | 359/246 |
| 2010/0021178 A1 * | 1/2010 | Toyoshima | ................... | 398/152 |

FOREIGN PATENT DOCUMENTS

JP 2920502 4/1999

* cited by examiner

*Primary Examiner* — Agustin Bello

(57) ABSTRACT

A switch is to be inputted a modulation signal including the synchronization signal extracted from a received communication signal as a control signal, is to be inputted a detection signal detected by a photodetector that receives a polarization modulation signal adjusted to a polarization direction of a quantum cipher signal, and selectively switches and outputs one of the detection signal and an inverted signal of the detection signal according to the control signal. A low-pass filter outputs the output signal of the switch, whereby a plus level signal is outputted when a relative angle difference $\Delta\theta$ between polarization axes on a transmission side and a reception side is larger than a predetermined polarization angle, a 0 level signal is outputted when $\Delta\theta$ is equal to the predetermined polarization angle, and a minus level signal is outputted when $\Delta\theta$ is in a range of the predetermined polarization angle from 0 degree.

7 Claims, 8 Drawing Sheets

POLARIZATION DIRECTION SYNCHRONIZATION DETECTING CIRCUIT AND RECEIVING APPARATUS

CROSS REFERENCE TO RELATED APPLICATIONS

This application claims the benefit of Japanese Patent Application No. 2008-188029, filed on Jul. 22, 2008, in the Japanese Intellectual Property Office, the disclosure of which is incorporated herein by reference.

BACKGROUND OF THE INVENTION

1. Field of the Invention

The present invention relates to a polarization direction synchronization detecting circuit and a receiving apparatus, and more particularly to a polarization direction synchronization detecting circuit and a receiving apparatus that detect, on a reception side, a light signal whose polarization direction is modulated on a transmission side that performs quantum cipher communication such as mobile communication of a satellite or the like, in synchronization with the transmission side.

2. Description of the Related Art

Concerning quantum cipher communication, I and others have proposed a technique of "a quantum cipher communication apparatus and method", which is not published and is not a prior art (Japanese Patent Application Serial No. 2007-229604, filed on Sep. 5, 2007). The proposed technique is to provide first communicating unit which transmits and receives a communication signal formed by relatively strong pulse light between a transmitter and a receiver even when relative positions of the transmitter and the receiver change, and second communicating unit which transmits and receives a relatively weak quantum cipher signal in a period in which the first communicating unit is turned off.

Structures of the transmitter and the receiver included in the proposed quantum cipher communication apparatus are illustrated in FIGS. 4 and 5, respectively. In the transmitter illustrated in FIG. 4, first, a predetermined pattern (a PN signal) generated by a PN generator 52 according to a clock from a clock 51 is supplied, through a switch SW, to a communication laser 66 via a falling-edge trigger pulse generating circuit 58. The communication laser 66 generates a communication signal having wavelength $\lambda 1$ of relatively strong pulse light and outputs the communication signal to a beam splitter 67. The beam splitter 67 directly reflects light having the wavelength $\lambda 1$ and directly transmits weak light (a quantum cipher signal) having wavelength $\lambda 2$ from a modulator 65.

A counter 56 counts clocks from the clock 51, and supplies a count value to a data controller 55. The data controller 55 controls the switch SW according to the count value. The switch SW is changed after the PN signal from the PN generator 52. Data (communication data) from an input data recorder 53 is supplied to the communication laser 66 through the falling edge trigger pulse generating circuit 58. When the falling-edge trigger pulse generating circuit 58 detects a filling edge of an input signal, the falling-edge trigger pulse generating circuit 58 drives first and second delay pulse generators 59 and 60 and the data controller 55. The data controller 55 causes, according to a random signal from a random generator 54, one of the first and second delay pulse generators 59 and 60 (depending on the output of the data controller 55) to generate a delay pulse after delay time D. A quantum cipher signal having the wavelength 2, which is weak compared with a communication signal, is generated from a first quantum laser 61 or a second quantum laser 62 according to the delay pulse and input to a polarization beam splitter 63. When polarization of the first quantum laser 61 is H and a polarization direction thereof is 0 degree, polarization of the second quantum laser 62 is V and a polarization direction thereof is 90 degrees. Each of the first quantum laser 61 and the second quantum laser 62 corresponds to 1 or 0 of a binary signal. The modulator 65 polarizes (modulates) a polarization direction of light output from the polarization beam splitter 63 by 45 degrees using the random signal from the random generator 54 as a modulation signal. The beam splitter 67 superimposes the output of the modulator 65 on the strong pulse light from the communication laser 66 and transmits the output.

In the receiver illustrated in FIG. 5, a light signal from the transmitter illustrated in FIG. 4 is distributed by a beam splitter 70. A strong pulse signal having the wavelength $\gamma 1$ is converted into an electric signal by a communication receiver 71. One of the signals is supplied to a clock data recovery circuit 72. A falling edge signal of the other signal is supplied to a delay pulse generator 78 and output to first and second single photon receivers 76 and 77 as a gate signal after delay time. A clock and data output from the clock data recovery circuit 72 are input to a communication data recorder 73 and stored (recorded). The data is supplied to a matching detection circuit 79 together with the clock. When the data is compared with a PN signal (a predetermined data pattern transmitted prior to the data) from a PN generator 83 and coincidence of the data and the PN signal is detected, a counter 80 for counting clocks is reset according to detection output.

A light signal representing a weak coherent quantum cipher having the wavelength $\gamma 2$ reflected by the beam splitter 70 is subjected to polarization (modulation) of 45 degrees by a signal from a random generator 84 in a modulator 74. Thereafter, a signal of polarized light H is separated to the first single photon receiver 76 and a signal of polarized light V is separated to the second single photon receiver 77 by the polarization beam splitter 75. The signals are respectively extracted by a gate signal from the delay pulse generator 78 and input to a data controller 81. In this way, at no signal time when transmission data falls on the transmission side, a quantum cipher signal transmitted at timing of fixed delay time from a falling edge can be extracted and recorded in the data controller 81.

FIG. 6 is a diagram of an example of quantum cipher communication by the transmitter and the receiver illustrated in FIGS. 4 and 5. When a satellite 92 is located over a ground station 90 at time T1, the satellite 92 generates, with a transmitter (having the structure illustrated in FIG. 4), a quantum key $\alpha$ and transmits a light signal superimposed on data A to the ground station 90. The ground station 90 receives the data A and the quantum key $\alpha$ with a receiver (having the structure illustrated in FIG. 5) and stores the data A and the quantum key $\alpha$. Thereafter, when the satellite 92 moves and is located over a ground station 91 at time T2, the satellite 92 generates another quantum key $\beta$, superimposes the quantum key $\beta$ on data B, and transmits the quantum key $\beta$ to the ground station 91. The ground station 91 receives and stores the data B and the quantum key $\beta$. Further, the satellite 92 calculates exclusive OR of the quantum keys $\alpha$ and $\beta$ to generate a quantum key $\gamma$, transmits the quantum key $\gamma$ to the ground stations 90 and 91, and allows the ground stations 90 and 91 to share the quantum keys $\alpha$ and $\beta$ by using the quantum key $\gamma$. In a case of FIG. 6, the same satellite 92 moves from a position on the ground station 90 to a position on the ground station 91.

However, the satellite 92 may perform the quantum cipher communication with not-illustrated other satellites.

As explained above, polarization modulation is performed in synchronization with the quantum cipher signal from the transmitter and polarization is applied to two angles (θ1 and θ2) according to signals ("1" and "0"). In the example illustrated in FIG. 4, light polarized to 0 degree from the first quantum laser 61 (the polarized light H: in a case of θ1=0 degrees) or light polarized to 90 degrees from the second quantum laser 62 (the polarized light V: in a case of θ2=90 degrees) is selected. Polarization modulation is applied to the light and the light is transmitted.

An angle relation of polarization modulation between the transmission side and the reception side is illustrated in FIG. 7. In FIG. 7, θ1 and θ2 represent axes on the transmission side. This example is an example in which θ1 and θ2 are orthogonal (or may not be orthogonal). As illustrated when polarization modulation is performed on the transmission side with θ1 set to 0 degree and θ2 set to 90 degrees, the reception side of mobile communication relatively changes by an arrival angle Δθ (a phase difference Δθ) with respect to the transmission side. The horizontal direction in FIG. 7 represents a polarization base (direction) on the reception side.

FIG. 8 is a diagram of the intensity of light obtained by receiving a polarized and modulated signal through a polarizer. As illustrated in FIG. 7, the intensity is the intensity of light received through a polarizer that causes light obtained by polarizing the polarized and modulated signal to 0 degree to pass and does not cause light polarized to 90 degrees to pass. "A" represents a polarization modulation waveform of communication data signal A signal of 90 degrees and a signal of 0 degree are alternately generated on the transmission side. When the signal "A" is received at the phase difference Δθ=0 degree, even if the signal is received through the polarizer that causes the light polarized to 0 degree to pass, as illustrated in "B", received light intensity of the light polarized to 0 degree is the maximum and received light intensity of the light polarized to 90 degrees is 0. On the other hand, when the phase difference is 0 degree <|Δθ|<45 degrees, even if the signal is received through the polarizer that causes the light polarized to 0 degree to pass, signal components of both the signal of 0 degree and the signal of 90 degree on the transmission side are received and a waveform represented by "C" is obtained. When the phase difference is 45 degrees <|Δθ|<135 degrees, the signal of 0 degree less easily passes through the polarizer. The received light intensity of the signal of 90 degrees is larger and a waveform represented by "D" is obtained. Phase is inverted from that of a transmission waveform in "A". Further, when the phase difference is 135 degrees <|Δθ|<180 degrees, a signal waveform represented by "E" is obtained. The signal waveform is the same as that represented by "C".

As explained above, a polarization angle relation of a light signal, an arrival angle relation of which relatively changes, changes as in a movable body (a transmission side or a reception side) such as a satellite. A synchronization detecting circuit for efficiently detecting an angle displacement component and adjusting a polarization axis direction on the reception side to a polarization base axis on the transmission side is necessary. However, the technique proposed by me and others of this application does not disclose a specific structure.

There is proposed a technique for creating a light wave, a polarization direction of which rotates in the detection of linearly-polarized light, transmitting the light wave through a polarization beam splitter to change light intensity, converting an electric signal with a photodetector, and performing synchronous detection with a signal synchronized with the rotation in the polarization direction using a lock-in amplifier (see Japanese Patent No. 2920502).

According to the technique disclosed in Japanese Patent No. 2920502, weak light is detected by rotating polarized light. Since the polarized light rotates on the reception side, the technique cannot be used for a quantum cipher signal used by fixing a polarization base axis.

SUMMARY OF THE INVENTION

It is an object of the present invention to provide a polarization direction synchronization detecting circuit that can efficiently detect an angle displacement component even if an arrival angle of light, a polarization direction of which is polarized and modulated at two angles on a transmission side, relatively changes and can highly accurately adjust a polarization axis direction of even weak light to a polarization base axis selected by the transmission side and a receiving apparatus that detects polarization direction synchronization.

A polarization direction synchronization detecting circuit according to the present invention receives a light signal modulated in two polarization directions according to signals and a light signal of a communication signal including a synchronization signal. The polarization direction synchronization detecting circuit includes: a switch inputted with a modulation signal including the synchronization signal extracted from a received communication signal as a control signal, inputted with a detection signal detected by a photodetector that receives a polarization modulation signal adjusted to a polarization direction of a quantum. cipher signal, and selectively switching and outputting one of the detection signal of the photodetector and an inverted signal of the detection signal according to the control signal, and a low-pass filter outputting the output signal of the switch, whereby a plus (+) level signal is outputted when a relative angle difference Δθ between polarization axes on a transmission side and a reception side is larger than a predetermined polarization angle set in advance, a 0 level signal is outputted when the relative angle difference is equal to the predetermined polarization angle, and a minus (−) level signal is outputted when the relative angle difference is in a range of the predetermined polarization angle from 0 degree.

Preferably, the polarization direction synchronization detecting circuit may include a band-pass filter passing a frequency of the synchronization signal, and provided between an output of the photodetector and an input of the switch.

Further, the polarization direction synchronization detecting circuit may include a low-pass filter provided at a post-stage of the envelope detector which is inputted with the output signal of the switch.

A receiving apparatus according to the present invention receives a light signal modulated in two polarization directions according to signals and a light signal of a communication signal including a synchronization signal, the receiving apparatus comprising polarizing unit including a polarization control unit that controls a polarization direction of received light according to a control signal The receiving apparatus includes: a polarization unit including a polarization control unit controlling polarization directions of a received light by a control signal; and a polarization direction synchronization detecting circuit inputted with a modulation signal including a synchronization signal extracted from the communication signal of the light signal outputted from the polarizing unit and with a signal detected by a photodetector that receives a polarization modulation signal adjusted to a polarization direction of a quantum cipher signal, an output signal of the polarization direction synchronization detecting circuit is supplied to the polarization control unit to controlling polarization directions of a received light, and further includes a switch selectively switching and outputting one of the detection signal of the photodetector and an inverted signal of the detection signal according to the control signal and a low-pass filter inputted with the output signal of the switch, whereby a plus level signal is outputted when a relative angle difference Δθ between polarization axes on a transmission side and a reception side is larger than a predetermined polarization angle set in advance, a 0 level signal is outputted when the relative angle difference is equal to the predetermined polarization angle, and a minus level signal is outputted when the relative angle difference is in a range of the predetermined polarization angle from 0 degree.

Further, the polarization direction synchronization detecting circuit included in the receiving apparatus may include an envelope detector inputted with the output signal of the switch and detecting amplitude of the output signal. The polarization direction synchronization detecting circuit included in the receiving apparatus may include a low-pass filter at a post-stage of the envelope detector which is inputted with the output of the switch.

According to the present invention, the reception side does not need to know attitude angle information on the transmission side. It is possible to highly accurately measure a polarization angle even under a situation in which background light is present as in space transmission. It is possible to adjust, with polarized and modulated reference light, a polarization axis direction of weak light for a quantum cipher including polarized light to a polarization base axis selected on the transmission side. This makes it possible to identify a polarization base on the reception side and serves the polarization base for a quantum cipher.

DETAILED DESCRIPTION OF THE PREFERRED EMBODIMENTS

Figure 1:
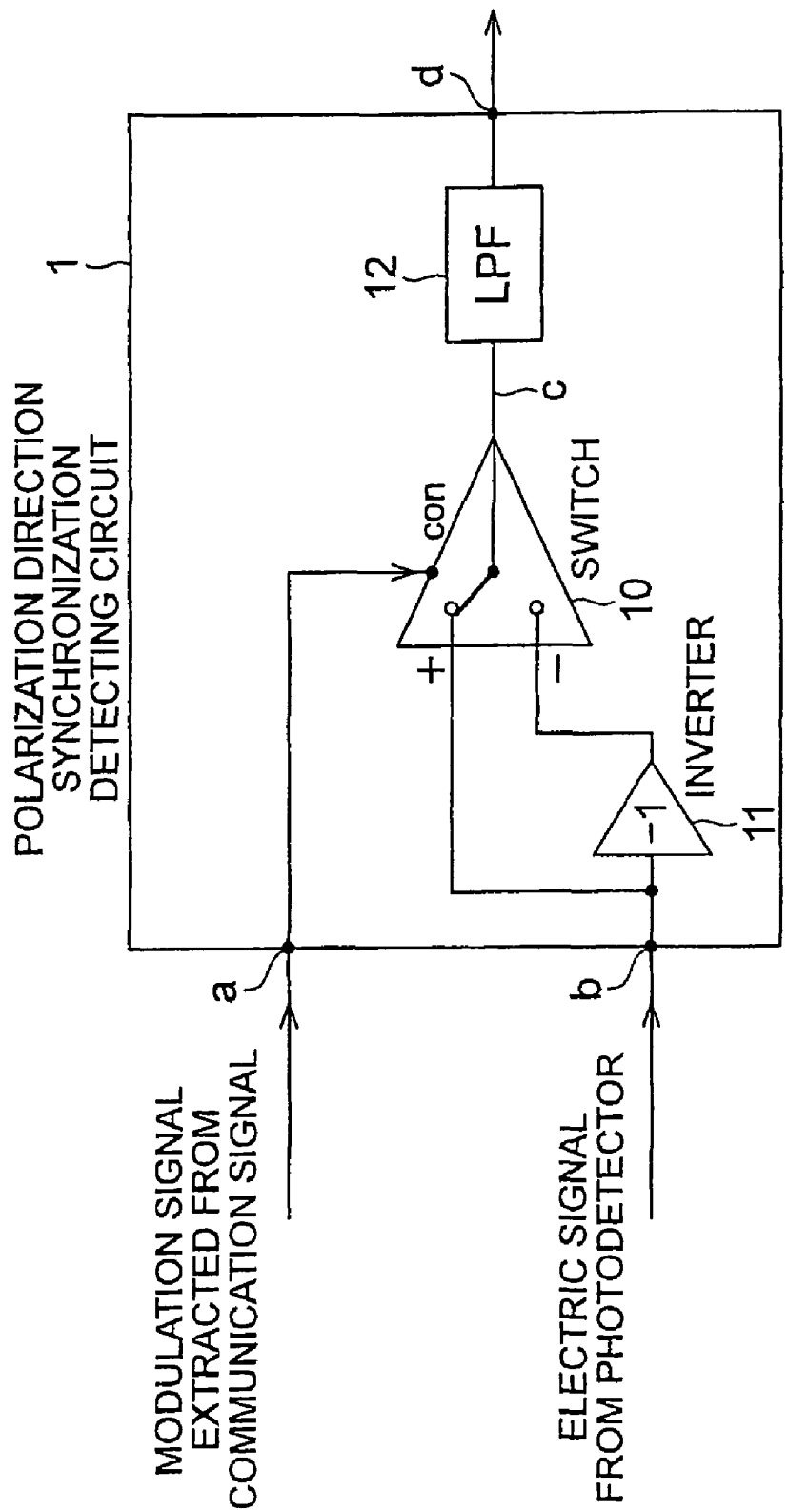
FIG. 1 is a diagram of a structure of a polarization direction synchronization detecting circuit according to an embodiment of the present invention.
Figure 2:
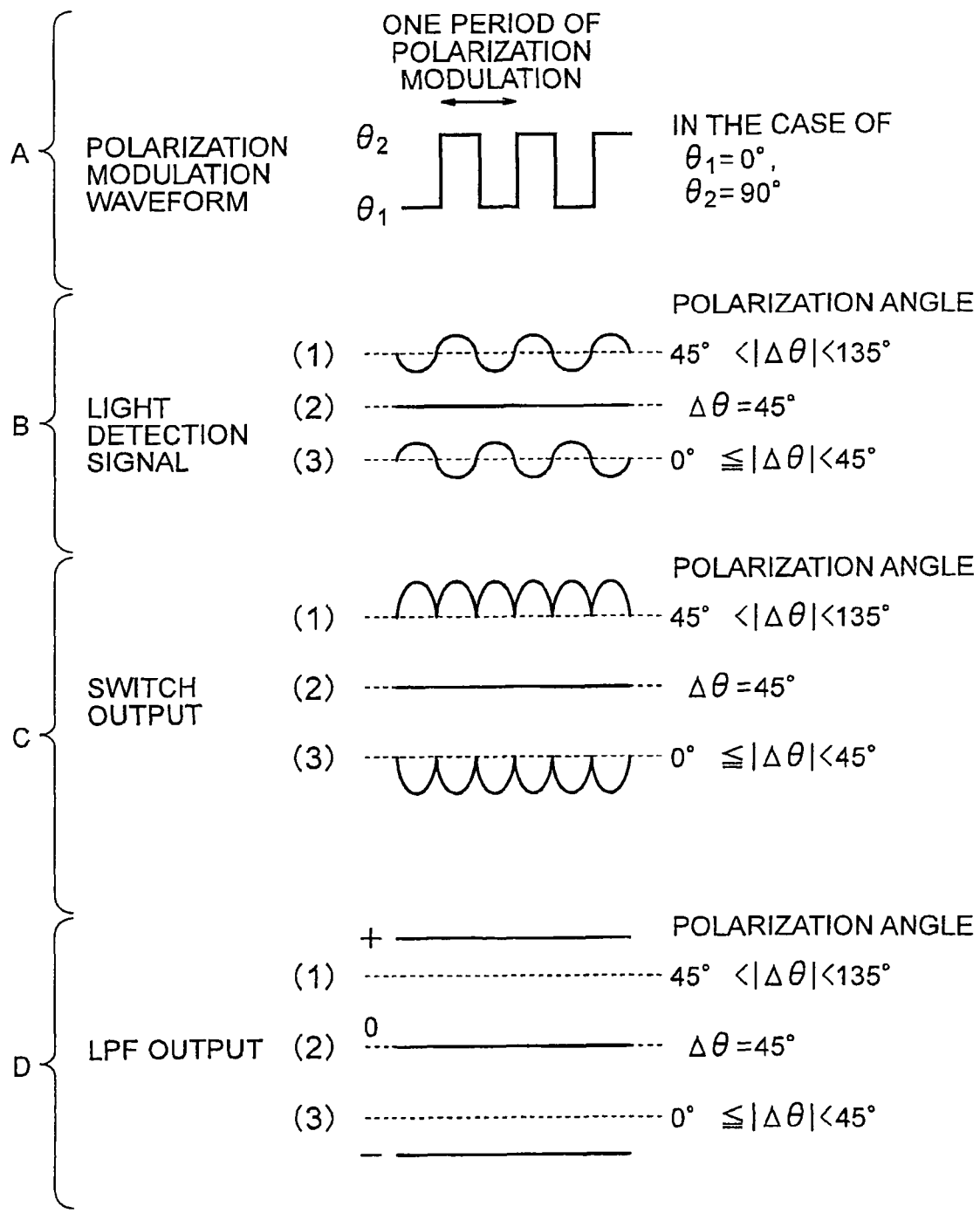
FIG. 2 is a diagram of signal waveforms of respective units in the structure according to the embodiment.

FIG. 1 is a diagram of a structure of a polarization. direction synchronization detecting circuit according to an embodiment of the present invention. FIG. 2 is a diagram of signal waveforms of respective units in the structure according to the embodiment. In FIG. 1, reference numeral 1 denotes a polarization direction synchronization detecting circuit, 10 denotes a switch (SW). which is controlled by an input (a modulation signal) "a" to alternatively select one of signals inputted to two input terminals "+ (plus)" and "− (minus)", 11 denotes an inverter, and 12 denotes a low-pass filter (LPF).

Figure 8:
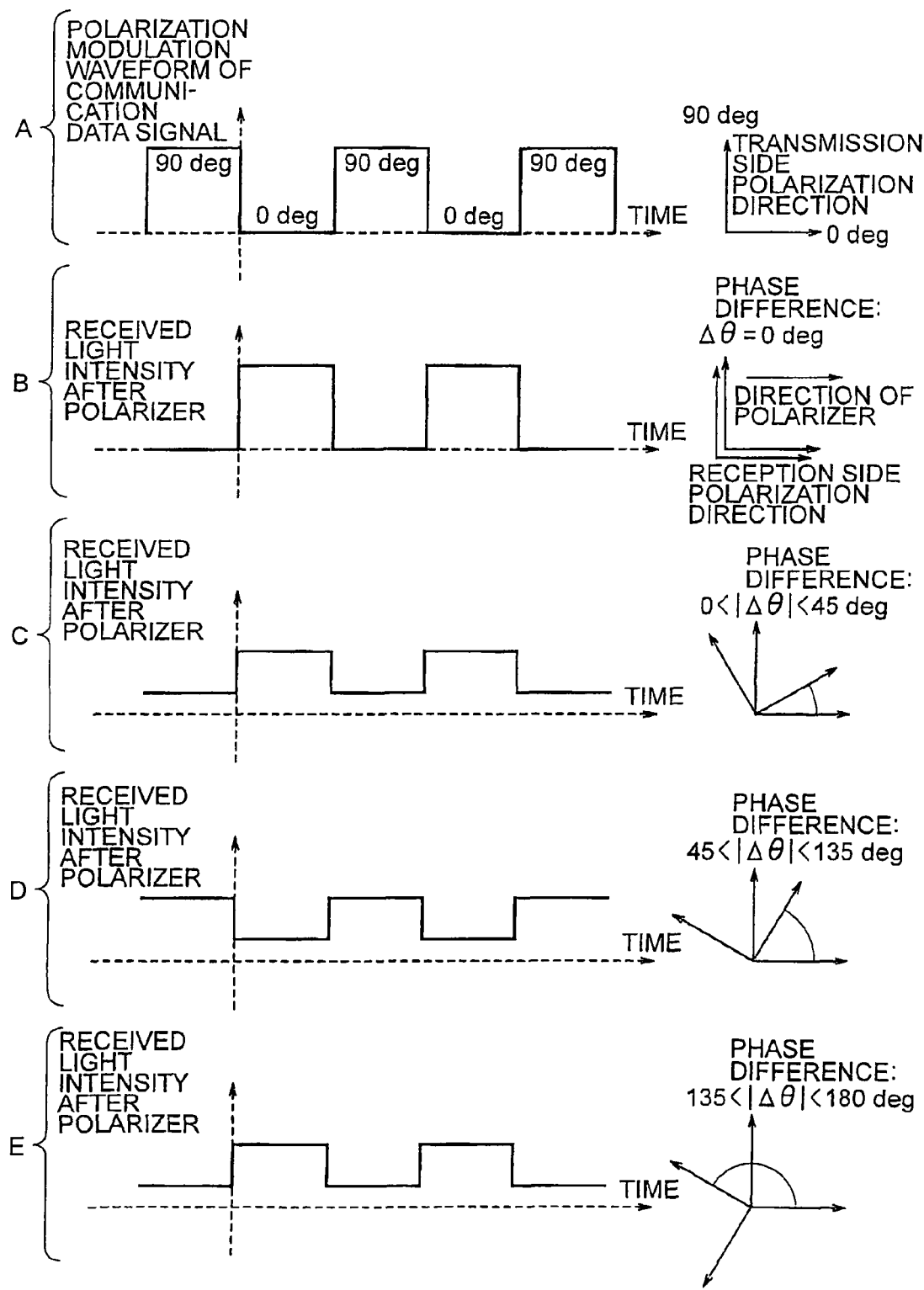
FIG. 8 is a diagram of the intensity of light obtained by receiving a polarized and modulated signal through a polarizer.

"A" in FIG. 2 represents polarization modulation on a transmission side, and is the same as "A" in FIG. 8. A reception signal of a polarization modulation signal is an input signal "b" illustrated in FIG. 1, and is supplied as a changeover signal for the switch 10. The amplitude and the phase of an alternating current component of a light signal, which is caused to pass through a polarizer that polarizes a reception signal on a reception side by 45°, are different according to a relative angle difference (Δθ) of polarization. In (1) of B in FIG. 2, the relative angle difference (Δθ) is 45°<|Δθ|<135°. A signal waveform is in the same phase with a modulated waveform. In a case of Δθ=45 degrees in (2), the amplitude is 0. In a case of 0°≦|Δθ|<45° in (3), a signal waveform is anti-phase with the modulated waveform.

A modulation signal (a signal extracted from a data pattern by a reception sign circuit) is inputted to an input terminal "a" of the polarization direction synchronization detecting circuit 1 illustrated in FIG. 1, and is inputted to a control terminal "con" of the switch 10. An electric signal ("B" in FIG. 2) obtained by detecting a light signal which passed through the polarizer, with the photodetector is inputted to an input terminal "b", and directly input to a plus (+) terminal of the switch 10. A signal, which passed through the inverter 11, is inputted to a minus (−) terminal of the switch 10.

In response to the input signal illustrated in "B" in FIG. 2, the switch 10 is changed to select the plus terminal of the switch 10 when the modulation signal from the control terminal "con" is at a plus (+) level, and is changed to select the minus terminal of the switch 10 when the modulation signal is at a minus (−) level. Consequently, signals of inverted waveforms on a plus (+) side and a minus (−) side as illustrated in (1) and (3) of "C" in FIG. 2 inverted from waveforms illustrated in (1) and (3) of "B" in FIG. 2 can be obtained from an output terminal "c" of the switch 10 by inverting a light detection signal "b" with a synchronization detecting circuit that uses the modulation signal from the control terminal "con" An output signal of the switch 10 is smoothed by causing the output signal to pass through the low-pass filter 12. Then, as illustrated in (1), (2), and (3) of D in FIG. 2, the level is inverted at Δθ=(θ2−θ1)/2. In the example illustrated in FIG. 2, θ2=90°, θ1=0°, and Δθ=45°. Therefore, the level is inverted from the plus level to the minus level at 45°.

It is possible to prevent fluctuation due to phasing from occurring by providing a band-pass filter (BPF) at a pre-stage of the input terminal "b" of the electric signal from the photodetector illustrated in FIG. 1. In that case, a frequency caused to pass by the band-pass filter is the modulation frequency illustrated in "A" in FIG. 2.

In FIG. 1, the low-pass filter 12 is provided to detect the amplitude of the output of the switch 10. However, the output of the switch 10 may be input to an envelope detector to detect the amplitude. Further, a low-pass filter can be provided at a post-stage of the envelope detector. This makes it possible to increase accuracy of amplitude detection and response speed.

Figure 3:
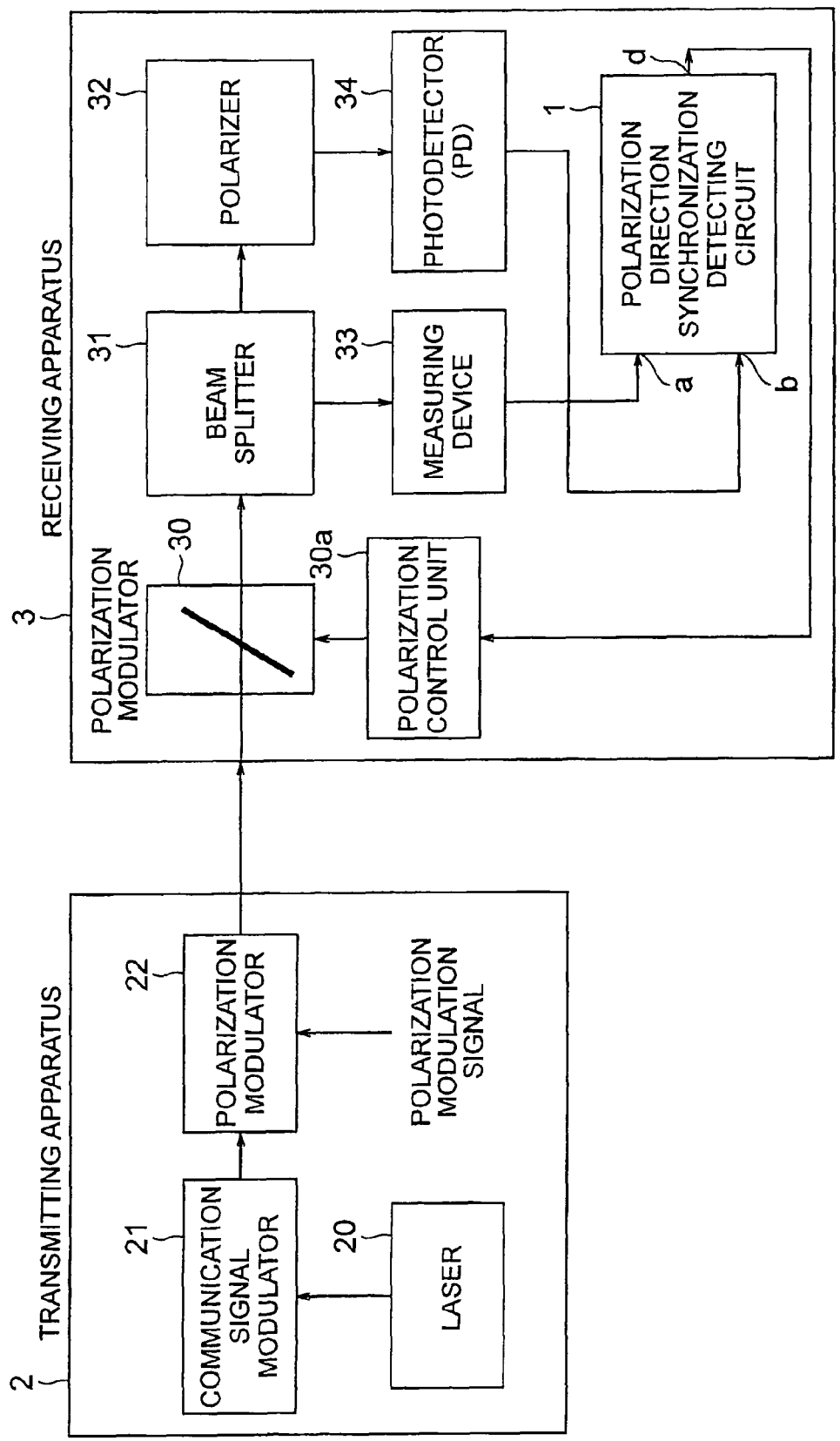
FIG. 3 is a diagram of an example of the polarization direction synchronization detecting circuit according to the present invention.
Figure 4:
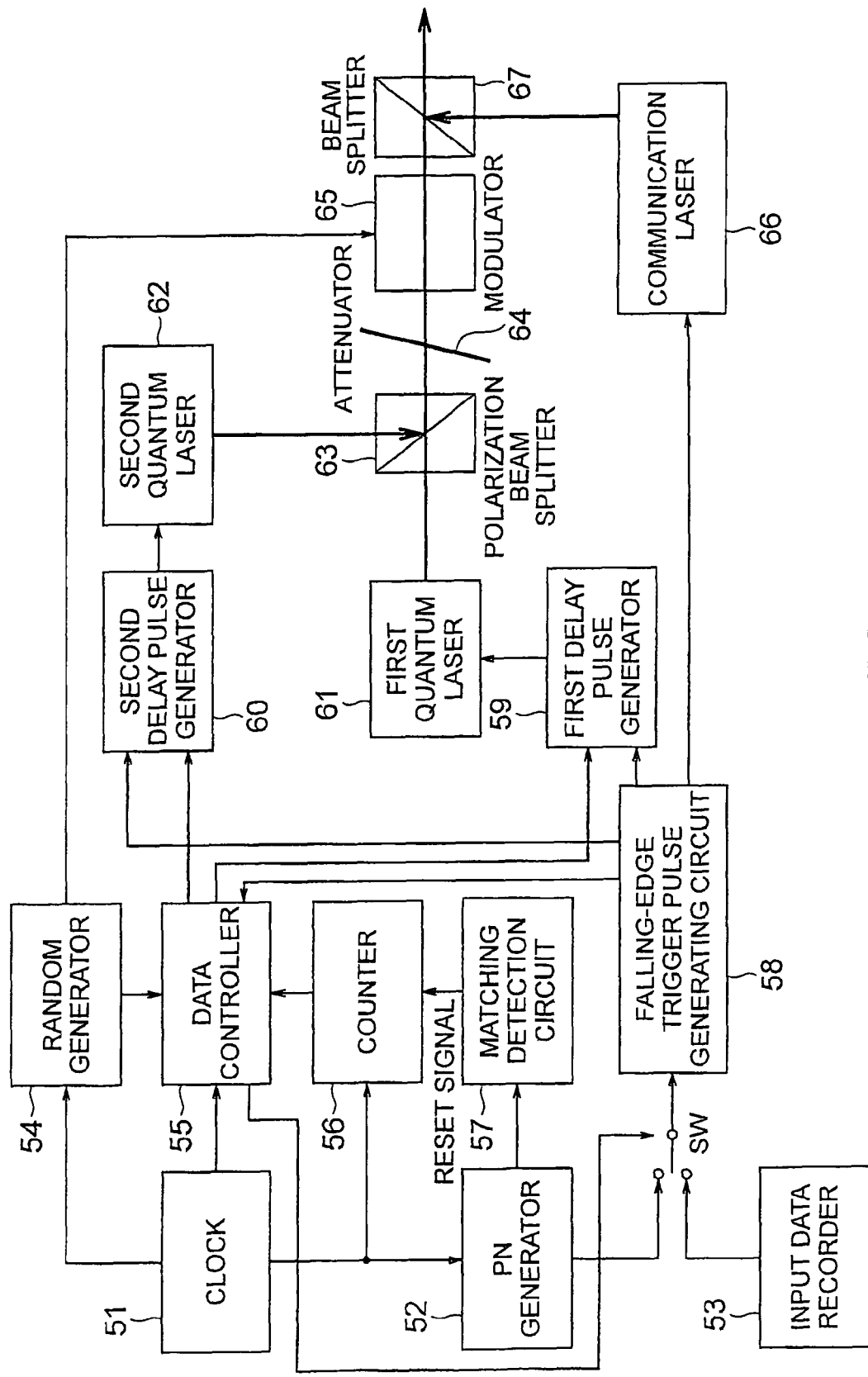
FIG. 4 is a diagram of a structure of a transmitter included in the proposed quantum cipher communication apparatus.
Figure 5:
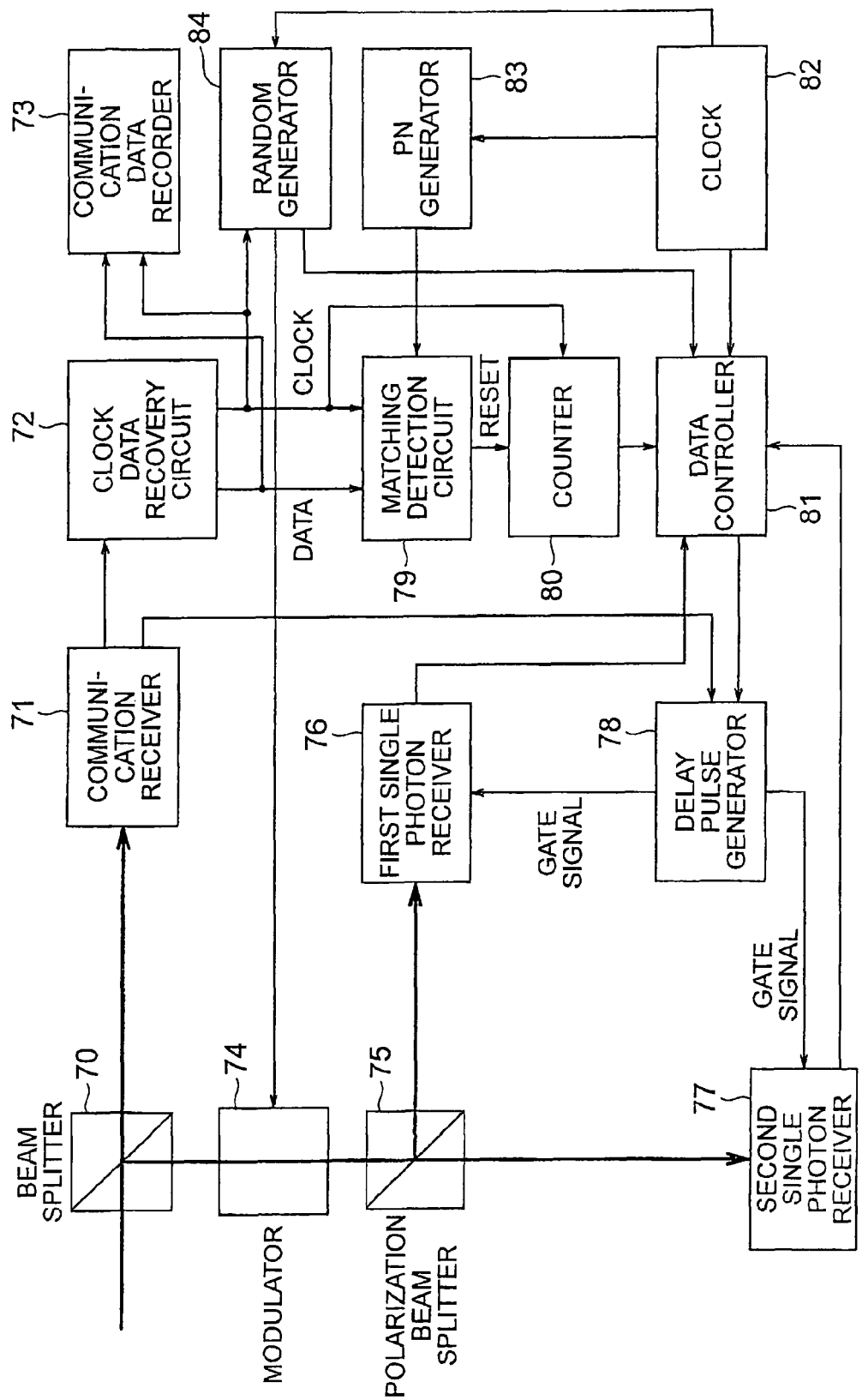
FIG. 5 is a diagram of a structure of a receiver included in the proposed quantum cipher communication apparatus.
Figure 6:
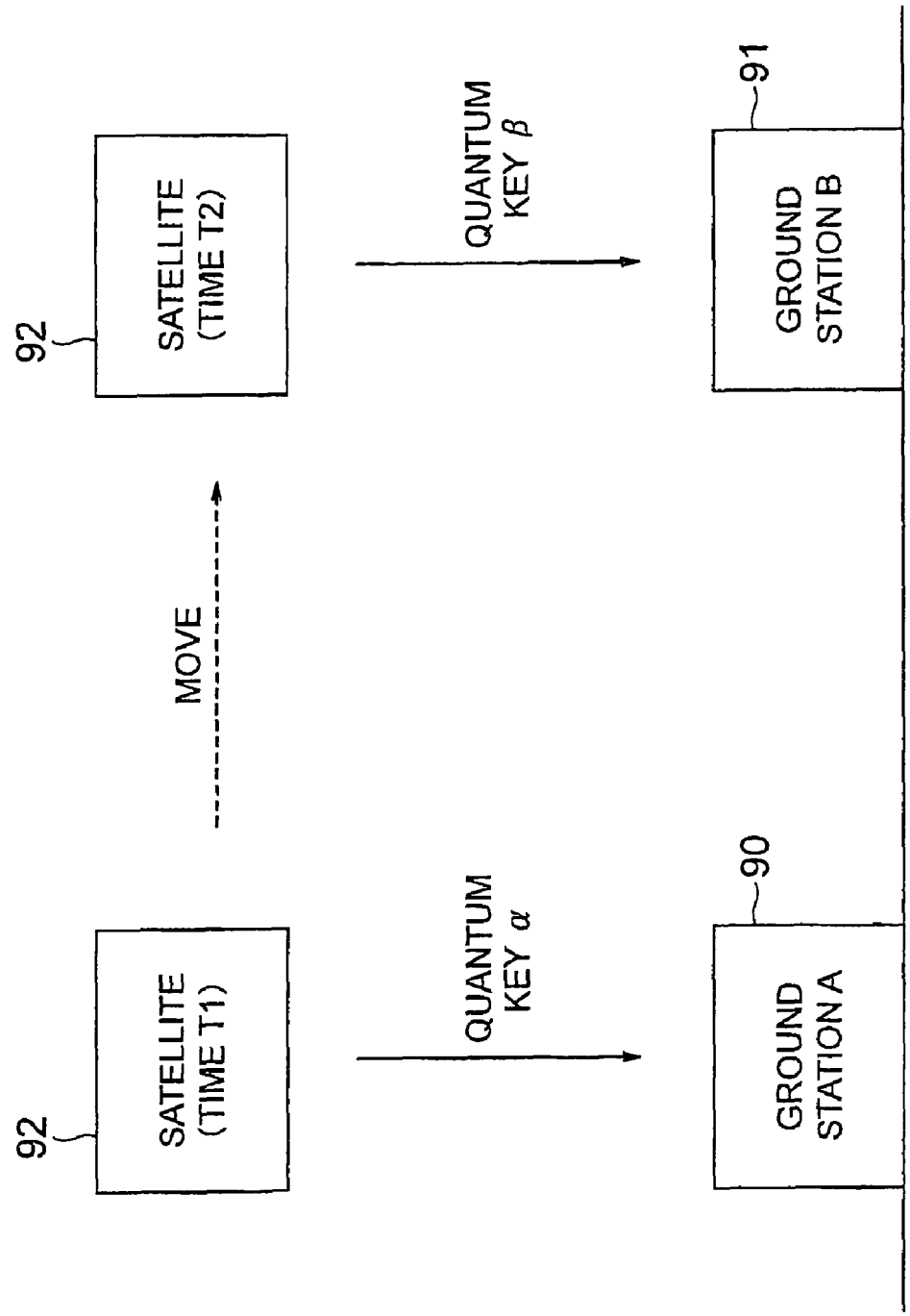
FIG. 6 is a diagram of an example of quantum cipher communication.
Figure 7:
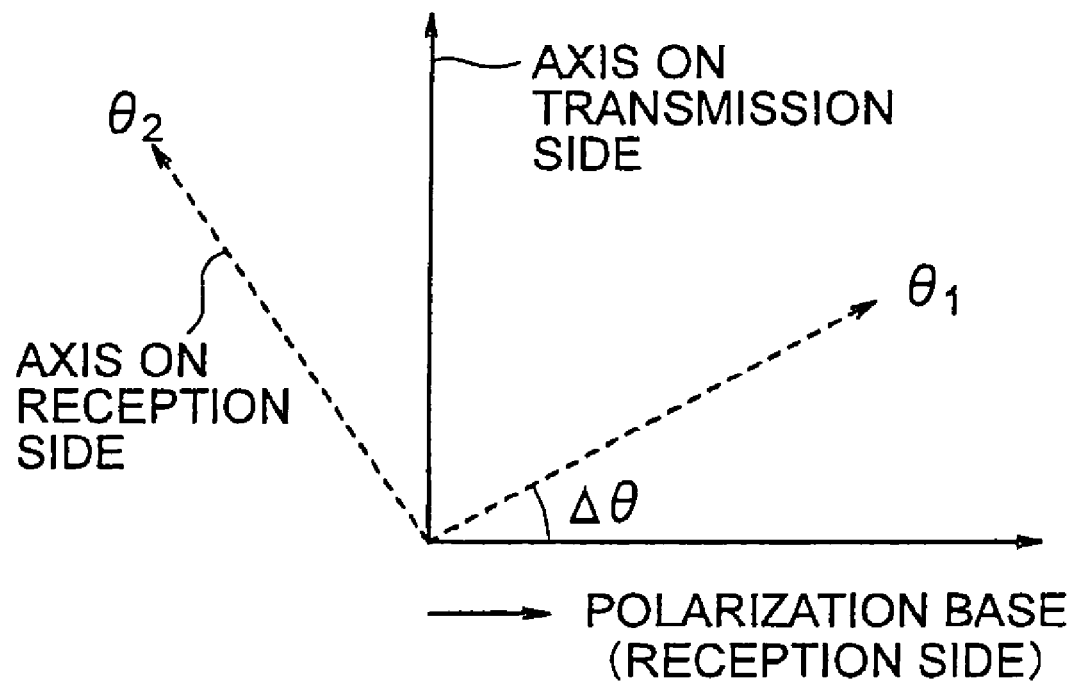
FIG. 7 is a diagram of an angle relation of polarization modulation on a trans ion side and a reception side.

FIG. 3 is a diagram of an example of the polarization direction synchronization detecting circuit according to the present invention. In the FIG. 3, there are provided a transmitting apparatus 2, a laser (laser apparatus) 20, a communication signal modulator 21, and a polarization modulator 22. The polarization modulator 22 performs polarization modulation for a communication signal according to a polarization modulation signal adjusted to a polarization direction of a quantum cipher signal. Further, a receiving apparatus 3 receives a polarization modulation signal transmitted from the transmitting apparatus. A polarization modulator 30 can control a polarization direction. A polarization control unit 30a controls a polarization function by the polarization modulator 30. A beam splitter 31 distributes a light signal. A polarizer 32 polarizes light, which passed through the beam splitter 31, by a fined angle (e.g., 45°). A measuring device 33 is inputted with a light signal including a synchronization signal reflected by the beam splitter 31, and demodulates data. And, a photodetector (PD) 34 detects a signal polarized by the polarizer 32, and generates an electric signal. The polarization direction synchronization detecting circuit 1 having the structure illustrated in FIG. 1 is provided in the receiving apparatus 3 illustrated in FIG. 3. Reference signs "a", "b", and "d" indicating input terminals and an output terminal of the polarization direction synchronization detecting circuit 1 are the same as the reference signs of the terminals of the circuit illustrated in FIG. 1.

The polarization modulator 30 illustrated in FIG. 3 can be realized by a half-wave plate that is mechanically rotated to control a polarization direction, a Faraday element E/O (electrical/optical) modulator, and the like.

The communication signal modulator 21 of the transmitting apparatus 2 modulates a light signal from the laser 20 for synchronization according to a data signal. The polarization modulator 22 subjects the output of the communication signal modulator 21 to orthogonal (or non-orthogonal) polarization modulation at 90° or 0° according to the input of a polarization modulation signal (including a synchronization signal), and transmits output light to a space.

In the receiving apparatus 3, when a received light signal is inputted to the polarization modulator 30, the polarization modulator 30 applies polarization (polarization base) corresponding to a rotation angle by the rotation control unit 30a at that point to the light signal. A data signal including a synchronization signal (a clock component) reflected by the beam splitter 31 is demodulated by the measuring device 33, and supplied to the input terminal "a" of the polarization direction synchronization detecting circuit 1 as a polarization modulation signal ("A" in FIG. 2).

Polarized light making a polarization direction of quantum cipher communication is detected by the polarizer 32 from a communication signal for synchronization that passed the beam splitter 31. When the polarized light is inputted to the photodetector (PD) 34, an electric signal corresponding to the light detection is outputted. The output from the photodetector 34 is supplied to the input terminal "b" of the polarization direction synchronization detecting circuit 1. The polarization direction synchronization detecting circuit 1 applies the operation indicated by "A" to "C" in FIG. 2 to the input signals "a" and "b" to generate +, 0, or—signal output corresponding to a polarization angle. Then, the output signal is inputted to the polarization control unit 30a of the polarization modulator 30 of FIG. 3 to control polarization. According to the polarization control, the polarization angle ($\Delta\theta$) is controlled to match the polarization direction of the quantum cipher signal.

In a case of $\Delta\theta=(\theta 2-\theta 1)/2\pm\pi/2$, sign reversing (a change from (1) to (3) of "D" in FIG. 2 or a change opposite to the change) also occurs. However, since polarity is reversed with respect to a rotating direction, it is possible to identify that an angle of $\pi/2$ is different.

Since a signal for controlling the polarization modulator of the light incident unit on the reception side is feedback controlled, it is possible to adjust a polarization as direction on the reception side to a polarization base axis selected on the transmission side. Since synchronous detection is used, the polarization direction synchronization detecting circuit is robust against background light noise, and can track polarized light of even weak light

What is claimed is:

1. A polarization direction synchronization detecting circuit that receives a light signal modulated in two polarization directions according to signals and a light signal of a communication signal including a synchronization signal, the polarization direction synchronization detecting circuit comprising:
    a switch inputted with a modulation signal including the synchronization signal extracted from a received communication signal as a control signal, inputted with a detection signal detected by a photodetector that receives a polarization modulation signal adjusted to a polarization direction of a quantum cipher signal, and selectively switching and outputting one of the detection signal of the photodetector and an inverted signal of the detection signal according to the control signal; and
    a low-pass filter outputting the output signal of the switch, whereby a plus level signal is outputted when a relative angle difference $\Delta\theta$ between polarization axes on a transmission side and a reception side is larger than a predetermined polarization angle set in advance, a 0 level signal is outputted when the relative angle difference is equal to the predetermined polarization angle, and a minus level signal is outputted when the relative angle difference is in a range of the predetermined polarization angle from 0 degree.

2. The polarization direction synchronization detecting circuit according to claim 1, further comprising:
    a band-pass filter passing a frequency of the synchronization signal, and provided between an output of the photodetector and an input of the switch.

3. A receiving apparatus that receives a light signal modulated in two polarization directions according to signals and a light signal of a communication signal including a synchronization signal, the receiving apparatus comprising polarizing unit including a polarization control unit that controls a polarization direction of received light according to a control signal, the receiving apparatus comprising:
    a polarization unit including a polarization control unit controlling polarization directions of a received light by a control signal; and
    a polarization direction synchronization detecting circuit inputted with a modulation signal including a synchronization sir extracted from the communication signal of the light signal outputted from the polarizing unit and with a signal detected by a photodetector that receives a polarization modulation signal-adjusted to a polarization direction of a quantum cipher signal, an output signal of the polarization direction synchronization detecting circuit supplied to the polarization control unit to controlling polarization directions of a received light, and further comprising a switch selectively switching and outputting one of the detection signal of the photodetector and an inverted signal of the detection signal according to the control signal and a low-pass filter inputted with the output signal of the switch, whereby a plus level signal is outputted when a relative angle difference $\Delta\theta$ between polarization axes on a transmission side and a reception side is larger than a predetermined polarization angle set in advance, a 0 level signal is outputted when the relative angle difference is equal to the predetermined polarization angle, and a minus level signal is outputted when the relative angle difference is in a range of the predetermined polarization angle from 0 degree.

4. A polarization direction synchronization detecting circuit that receives a light signal modulated in two polarization directions according to signals and a light signal of a communication signal including a synchronization signal, the polarization direction synchronization detecting circuit comprising:
   a switch inputted with a modulation signal including the synchronization signal extracted from a received communication signal as a control signal, inputted with a detection signal detected by a photodetector that receives a polarization modulation signal adjusted to a polarization direction of a quantum cipher signal, and selectively switching and outputting one of the detection signal of the photodetector and an inverted signal of the detection signal according to the control signal; and
   an envelope detector inputted with the output signal of the switch and detecting amplitude of the output signal, whereby a plus level signal is outputted when a relative angle difference $\Delta\theta$ between polarization axes on a transmission side and a reception side is larger than a predetermined polarization angle set in advance, a 0 level signal is outputted when the relative angle difference is equal to the predetermined polarization angle, and a minus level signal is outputted when the relative angle difference is in a range of the predetermined polarization angle from 0 degree.

5. The polarization direction synchronization detecting circuit according to claim 4, further comprising:
   a low-pass filter provided at a post stage of the envelope detector which is inputted with the output signal of the switch.

6. A receiving apparatus that receives a light signal modulated in two polarization directions according to signals and a light signal of a communication signal including a synchronization signal, the receiving apparatus comprising polarizing unit including a polarization control unit that controls a polarization direction of received light according to a control signal, the receiving apparatus comprising:
   a polarization unit including a polarization control unit controlling polarization directions of a received light by a control signal; and
   a polarization direction synchronization detecting circuit inputted with a modulation signal including a synchronization signal extracted from the communication signal of the light signal outputted from the polarizing unit and with a signal detected by a photodetector that receives a polarization modulation signal adjusted to a polarization direction of a quantum cipher signal, an output signal of the polarization direction synchronization detecting circuit supplied to the polarization control unit to controlling polarization directions of a received light, and further comprising a switch selectively switching and outputting one of the detection signal of the photodetector and an inverted signal of the detection signal according to the control signal and an envelope detector which is inputted with the output signal of the switch, whereby a plus level signal is outputted when a relative angle difference $\Delta\theta$ between polarization axes on a transmission side and a reception side is larger than a predetermined polarization angle set in advance, a 0 level signal is outputted when the relative angle difference is equal to the predetermined polarization angle, and a minus level signal is outputted when the relative angle difference is in a range of the predetermined polarization angle from 0 degree.

7. The receiving apparatus according to claim 6, wherein the polarization direction synchronization detecting circuit further includes a low-pass filter which is inputted with the output of the envelope detector.

* * * * *

UNITED STATES PATENT AND TRADEMARK OFFICE
CERTIFICATE OF CORRECTION

PATENT NO. : 8,131,160 B2  Page 1 of 1
APPLICATION NO. : 12/458731
DATED : March 6, 2012
INVENTOR(S) : Morio Toyoshima It is certified that error appears in the above-identified patent and that said Letters Patent is hereby corrected as shown below:

IN THE CLAIMS:

Column 8, Line 49, In Claim 3, delete "sir" and insert -- signal --, therefor.

Column 8, Line 52, In Claim 3, delete "signal-adjusted" and insert -- signal adjusted --, therefor.

Column 9, Line 32, In Claim 5, delete "post stage" and insert -- post-stage --, therefor.

Signed and Sealed this
Fourth Day of September, 2012

David J. Kappos
*Director of the United States Patent and Trademark Office*